(12) United States Patent
Stockmeier

(10) Patent No.: US 11,958,362 B1
(45) Date of Patent: Apr. 16, 2024

(54) ALL-TERRAIN VEHICLE ASSEMBLY WITH BED OUTLET AND METHOD FOR POWERING THE SAME

(71) Applicant: Honda Motor Co., Ltd., Tokyo (JP)

(72) Inventor: Kevin C. Stockmeier, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/057,472

(22) Filed: Nov. 21, 2022

(51) Int. Cl.
*B60L 1/00* (2006.01)

(52) U.S. Cl.
CPC ............ *B60L 1/006* (2013.01); *B60L 2260/22* (2013.01); *B60Y 2200/20* (2013.01)

(58) Field of Classification Search
CPC ... B60L 1/006; B60L 2260/22; B60Y 2200/20
See application file for complete search history.

(56) References Cited

U.S. PATENT DOCUMENTS

| | | | |
|---|---|---|---|
| 5,274,322 A | 12/1993 | Hayashi et al. | |
| 5,504,417 A | 4/1996 | Kern et al. | |
| 5,708,352 A | 1/1998 | Umeda et al. | |
| 6,404,072 B2 | 6/2002 | Onoyama et al. | |
| 6,864,606 B2 | 3/2005 | Rose, Sr. | |
| 7,300,382 B2 | 11/2007 | Yamamoto | |
| 7,719,126 B2 | 5/2010 | Foreman | |
| 8,723,344 B1 | 5/2014 | Dierickx | |
| 8,985,253 B2 | 3/2015 | Winter et al. | |
| 10,109,176 B2 * | 10/2018 | Wright | G08B 21/14 |
| 10,501,032 B2 * | 12/2019 | Secord | H01R 25/003 |
| 10,926,610 B2 * | 2/2021 | Schumacher | B60H 1/00428 |
| 11,043,801 B2 * | 6/2021 | Revach | B60L 1/006 |
| 11,059,474 B2 * | 7/2021 | Revach | H01R 25/006 |
| 11,110,800 B2 * | 9/2021 | Salter | B60K 6/26 |
| 11,465,506 B2 * | 10/2022 | Thompson | B60R 16/033 |
| 2005/0109550 A1 * | 5/2005 | Buglione | B60K 6/48 |
| | | | 180/65.25 |
| 2009/0166108 A1 | 7/2009 | Gross et al. | |
| 2016/0164289 A1 | 6/2016 | Oyobe et al. | |
| 2019/0084506 A1 * | 3/2019 | Gutierrez | H02K 11/33 |

(Continued)

FOREIGN PATENT DOCUMENTS

| | | | |
|---|---|---|---|
| CN | 109153315 B * | 4/2022 | B60H 1/00007 |
| EP | 3075989 A1 * | 10/2016 | B60L 15/2045 |

(Continued)

*Primary Examiner* — Adam D Houston
(74) *Attorney, Agent, or Firm* — KENEALY VAIDYA LLP

(57) ABSTRACT

Apparatus and method of powering an outlet in a bed of an all-terrain vehicle. The all-terrain vehicle can include an engine coupled to an electric generator. The method can include activating a generator mode of the engine, generating power by utilizing the electric generator of the all-terrain vehicle coupled to the engine, supplying the power to an inverter, that can convert the power to AC power, and supplying the AC power to the outlet in the bed of the all-terrain vehicle. A controller can discontinue power to at least one accessory when power is supplied to the outlet. The electric generator can be mounted to an air conditioning compressor mount structure of the vehicle.

20 Claims, 9 Drawing Sheets

(56) References Cited

U.S. PATENT DOCUMENTS

| | | | | |
|---|---|---|---|---|
| 2019/0148929 A1* | 5/2019 | Wang | .................... | G01R 27/20 |
| | | | | 361/42 |
| 2020/0014206 A1* | 1/2020 | Haartsen | ............ | H01R 13/6683 |
| 2020/0076217 A1* | 3/2020 | Filippi | .................. | B60L 3/0069 |
| 2020/0086743 A1* | 3/2020 | Jala | ......................... | B60L 50/60 |
| 2020/0108819 A1* | 4/2020 | Revach | ................ | B60W 20/13 |
| 2020/0112163 A1* | 4/2020 | Revach | ................. | H01H 71/70 |
| 2020/0122585 A1* | 4/2020 | Bhat | ................. | G05B 19/0426 |
| 2020/0317057 A1* | 10/2020 | Salter | ....................... | B60K 6/26 |
| 2021/0104851 A1* | 4/2021 | Bhat | ...................... | B60L 55/00 |
| 2021/0354641 A1* | 11/2021 | James | ................. | B60R 16/005 |
| 2021/0362604 A1* | 11/2021 | Salter | .................... | B60L 1/006 |

FOREIGN PATENT DOCUMENTS

| | | | |
|---|---|---|---|
| JP | 6002269 B1 | 10/2016 | |
| WO | WO2010119673 A1 | 10/2010 | |

\* cited by examiner

ALL-TERRAIN VEHICLE ASSEMBLY WITH BED OUTLET AND METHOD FOR POWERING THE SAME

BACKGROUND

The disclosed subject matter relates to an all-terrain vehicle assembly that includes a bed outlet. More particularly, the disclosed subject matter relates to an all-terrain vehicle assembly that can include a power supply system for powering an outlet in the bed of the all-terrain vehicle and methods of powering the outlet in the all-terrain vehicle.

A vehicle can travel along any one or combination of improved, unimproved, and unmarked paths. Some vehicles can be configured with additional structures that can improve passenger enjoyment of the destinations that are located along or accessed by the improved, unimproved, or unmarked paths.

However, known structures provided for improved enjoyment by passengers when at destinations have deficiencies.

SUMMARY

Some embodiments are directed to a method of powering an outlet in a bed of an all-terrain vehicle, the all-terrain vehicle having an engine coupled to an electric generator, the method can include activating a generator mode of the engine. The method can include generating power by utilizing the electric generator of the all-terrain vehicle coupled to the engine; supplying the power to an inverter, the inverter converting the power to AC power; and supplying the AC power to the outlet in the bed of the all-terrain vehicle.

Some embodiments are directed to an all-terrain vehicle including a frame assembly that can include a plurality of frame members connected together to extend around a passenger space. The frame assembly can include a bed assembly disposed to a rear of the passenger space, a plurality of wheels attached to the frame assembly, an engine mounted to the frame assembly in front of the passenger space. The engine can include a first mode and a second mode and an electric motor coupled to the engine. An inverter can be electrically connected to the electric motor. An outlet can be electrically connected to the inverter and disposed in the bed assembly, and a controller can be electrically connected to the electric motor. The controller can be configured to supply power generated by the electric motor to the inverter, the inverter converting the power to AC power, and supply the AC power to the outlet when the controller detects the engine is in the first mode, and disable power output to the invertor when the controller detects the engine is in the second mode.

Some embodiments are directed to a power supply system for an all-terrain vehicle having an outlet in a bed of the all-terrain vehicle. The power supply system can include an engine configured to mount to the all-terrain vehicle, the engine having a first mode and a second mode, an electric motor coupled to the engine, an inverter electrically connected to the electric motor, the outlet electrically connected to the inverter; and a controller electrically connected to the electric motor. The controller can be configured to supply power generated by the electric motor to the inverter, the inverter converting the power to AC power, and supply the AC power to the outlet when the controller detects the engine is in the first mode, and disable power output to the inverter when the controller detects the engine is in the second mode.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of exemplary embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Vehicles configured for travel on unimproved paths or unmarked paths can reach destinations that are remote or far from utilities and comforts that are available to vehicles that travel on paved roads. For example, a remote destination may not have any connection to a power grid. Occupants of vehicles that travel on unimproved paths to remote destinations may desire additional comforts for their journey that require the use of power. However, some comforts may be available to occupants only through the use of accessories that require battery power or external generators. Accordingly, it can be beneficial to provide a built in power generator using the vehicle to fulfill electricity needs.

Figure 1:
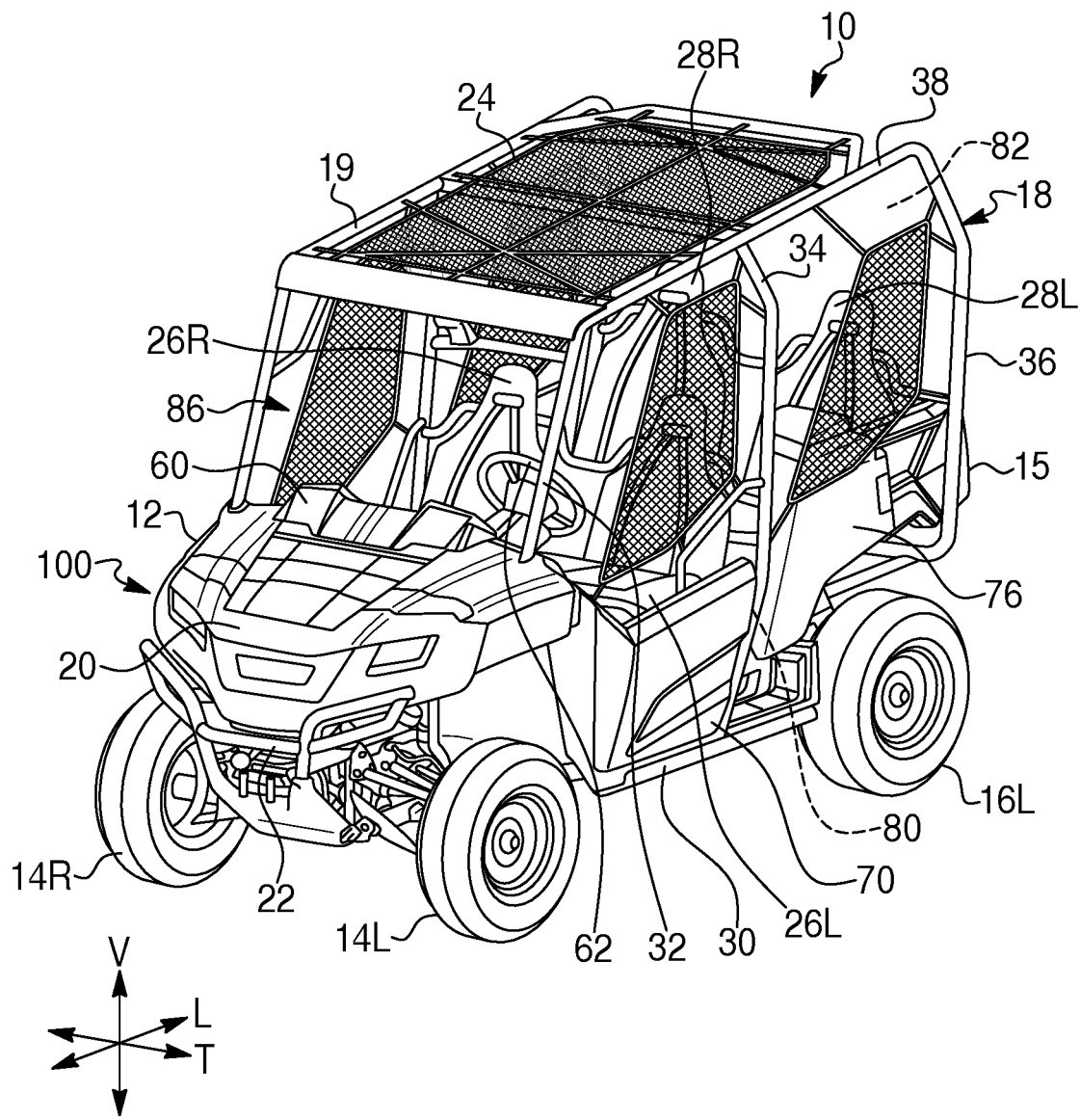
FIG. 1 is a perspective view of a vehicle made in accordance with principles of the disclosed subject matter.

FIG. 1 is a perspective view of an exemplary vehicle 10 including a power supply system 100 made in accordance with principles of the disclosed subject matter. The vehicle 10 shown in FIG. 1 is specialized for use in off road environments, such as on an unimproved path or on an unmarked path, and can be referred to as a multipurpose utility vehicle (MUV) or as a side-by-side all-terrain vehicle (SxS, or SxS ATV). However, the disclosed vehicle frame assembly with door assembly can be used with any vehicle that is configured for travel along any one or combination of improved, unimproved, and unmarked paths. For example, embodiments are intended to include or otherwise cover any type of vehicle including an automobile, including a passenger car, minivan, truck, other types of all-terrain vehicle (ATV), semi-tractor, off-highway vehicle, snowmobile, boat, plane, etc.

Figure 2:
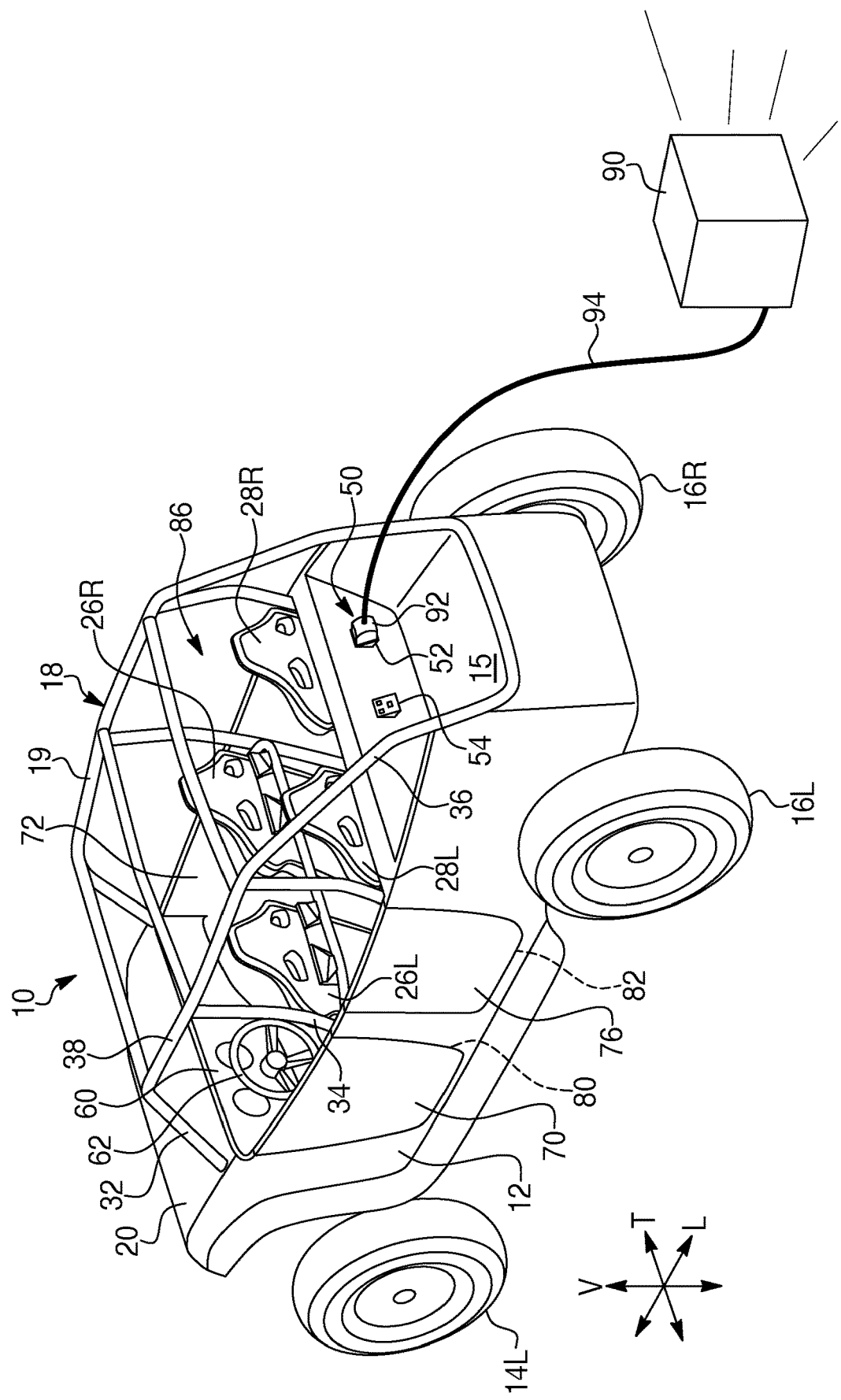
FIG. 2 is a perspective rear view of a vehicle, having an external accessory attached, made in accordance with principles of the disclosed subject matter.

Referring to FIGS. 1 and 2, the vehicle 10 can include a body 12, a pair of front wheels, 14L, 14R, a pair of rear wheels 16L, 16R, a frame assembly 18, a pair of front door assemblies 70, 72, a pair of rear door assemblies 76, 78, a hood 20, a front bumper 22, a net assembly 24 (omitted from FIG. 2 for clarity), and a powertrain. The powertrain is omitted from FIGS. 1 and 2 for simplicity and clarity of the drawings.

The frame assembly 18 can include a plurality of frame members connected together to extend around a passenger space 86 and can be configured to support the body 12, door assemblies 70, 72, 76, 78, seats 26L, 26R, 28L, 28R, suspension components for the wheels 14L, 14R, 16L, 16R, powertrain, steering system, control pedal assemblies, passengers and cargo items, for example. The frame assembly 18 can be configured to withstand various modes of operation, including operation on unimproved paths, and can be configured to surround the passenger space 86. The frame assembly 18 can also provide an overall bending stiffness and torsional stiffness characteristic for the vehicle 10 that can be advantageous for rugged terrain of an unimproved path.

The frame assembly 18 can include a rollover protection assembly 19. The rollover protection assembly 19 generally defines the passenger compartment. The rollover protection assembly 19 can extend in the longitudinal direction L of the vehicle 10, from the front end of the passenger space 86 to the rear end of the passenger space 86. The rollover protection assembly 19 can define the limits of the passenger space 86 in the transverse direction T of the vehicle 10, the longitudinal direction L of the vehicle 10 and in the vertical direction V of the vehicle 10. The rollover protection assembly 19 can be configured to support the door assemblies 70, 72, 76, 78 and any appropriate portion(s) of the body 12, such as but not limited to flexible side panel(s) (transparent, opaque, or a combination thereof), rigid side panel(s), roof panel (rigid or flexible), flexible or rigid rear panel (transparent, opaque, or a combination thereof), etc.

The rollover protection assembly 19 can be configured to resist, impede, or minimize deformation that could be caused by a load or kinetic energy input into the rollover protection assembly 19. The rollover protection assembly 19 can be configured with any shape and contour that can be advantageous to meet the structural performance and aesthetic appeal desired for the vehicle 10. The rollover protection assembly 19 can be formed from any appropriate number of structural elements, from one to any number greater than one. For example, the rollover protection assembly 19 can include a plurality of frame members 30, 32, 34, 36, and 38 (as shown in FIG. 1), and the right side of the vehicle can be a mirror image of the left side of the vehicle shown in FIG. 1. Each of the frame members can be configured as a hollow tube having a substantially circular or oval cross-section shape. The frame members can be configured with any appropriate elongated shape that can provide the desired dimensionality of the passenger space 86 and advantageously conform to the aesthetic appearance desired for the vehicle 10. For example, the frame members can be made from one or more lengths of a metal tube(s), ceramic tube(s), plastics, or other materials. Any one of the tubular frame members can be bent in one or more locations into a predetermined shape.

The vehicle 10 can include a pair of front seats 26L, 26R and a pair of rear seats 28L, 28R mounted in the passenger space 86 of the vehicle 10. The rollover protection assembly 19 can be configured to extend around and above the seats 26L, 26R, 28L, 28R and the passenger space 86. The rollover protection assembly 19 can cooperate with the body 12 and/or at least a portion of the frame assembly 18 to define door openings 80, 82 through which a passenger may pass in order to enter or exit the passenger space 86.

The vehicle 10 can include a front bumper 22 mounted to the frame assembly 18, suspension members, a hood 20 adjacent to the front bumper 22, a steering wheel 62, and accessories, such as but not limited to, headlights, power steering, system for heating ventilation and air conditioning (HVAC), an instrument panel 60, a wind deflector, and a windshield.

The vehicle 10 can include a powertrain. The powertrain can include a transmission 150 and an internal combustion engine, one or more electric motor(s) or a hybrid of an internal combustion engine and one or more electric motor(s), or other known engine/motor (also referred to as a power source). The powertrain can have the engine/motor output axis oriented in the longitudinal direction L or in the traverse direction T of the vehicle 10. The powertrain can be mounted to the frame assembly 18 in front of the passenger space 86. The powertrain can be configured to drive only the front wheels 14L, 14R, or configured to drive only the rear wheels 16L, 16R, or configured to drive all of the wheels 14L, 14R, 16L, 16R, or configured to drive the rear wheels 16L, 16R and selectively drive the front wheels 14L, 14R, or configured to drive the front wheels 14L, 14R and selectively drive the rear wheels 16L, 16R.

The transmission 150 can be an automatic transmission, a manual transmission, or a semi-automatic transmission. The transmission 150 can include an input shaft, an output shaft, and a speed ratio assembly. A coupling can connect the engine output shaft 48 to the input shaft of the transmission 150. The coupling can permit selective engagement/disengagement of the input shaft with the engine output shaft 48, or at least relative rotation of the engine output shaft 48 with respect to the input shaft, in any manner known in the art. Exemplary couplings can include, but are not limited to, a friction disc clutch and a torque converter. A control assembly can include a controller, a speed sensor and a gear selector 68.

The speed ratio assembly can connect the input shaft to the transmission output shaft such that the transmission output shaft can rotate at variable speeds relative to the input shaft. The speed ratio assembly can be a stepped speed ratio assembly or a continuously variable speed ratio assembly, as is known in the art. The transmission input shaft can be referred to as a mainshaft.

Referring to FIG. 2, The vehicle 10 can include one or more panels that form a cargo/storage area 15 (also referred to as a bed or bed assembly of the vehicle 10) at the rear of the vehicle 10. The cargo area 15 can include one or more outlets 50 (also referred to as sockets) that can provide alternating current ("AC"). The outlets 50 can be located outside the passenger space 86. For example, as shown in FIG. 2, two outlets 52, 54 are provided in the cargo area 15. The outlet 52 is shown with an appliance 90 plugged into the outlet 52 via a plug 92 and wire 94 connected to the appliance 90. The outlet 52 can provide AC electrical power to the appliance 90 that is generated by the engine 42 coupled to an electric generator 44. The outlet 52 can provide 120 Volt AC power, for example. The outlets 50 can be any type of socket and can be configured to connect with any type of plug for powering external accessories.

Figure 3:
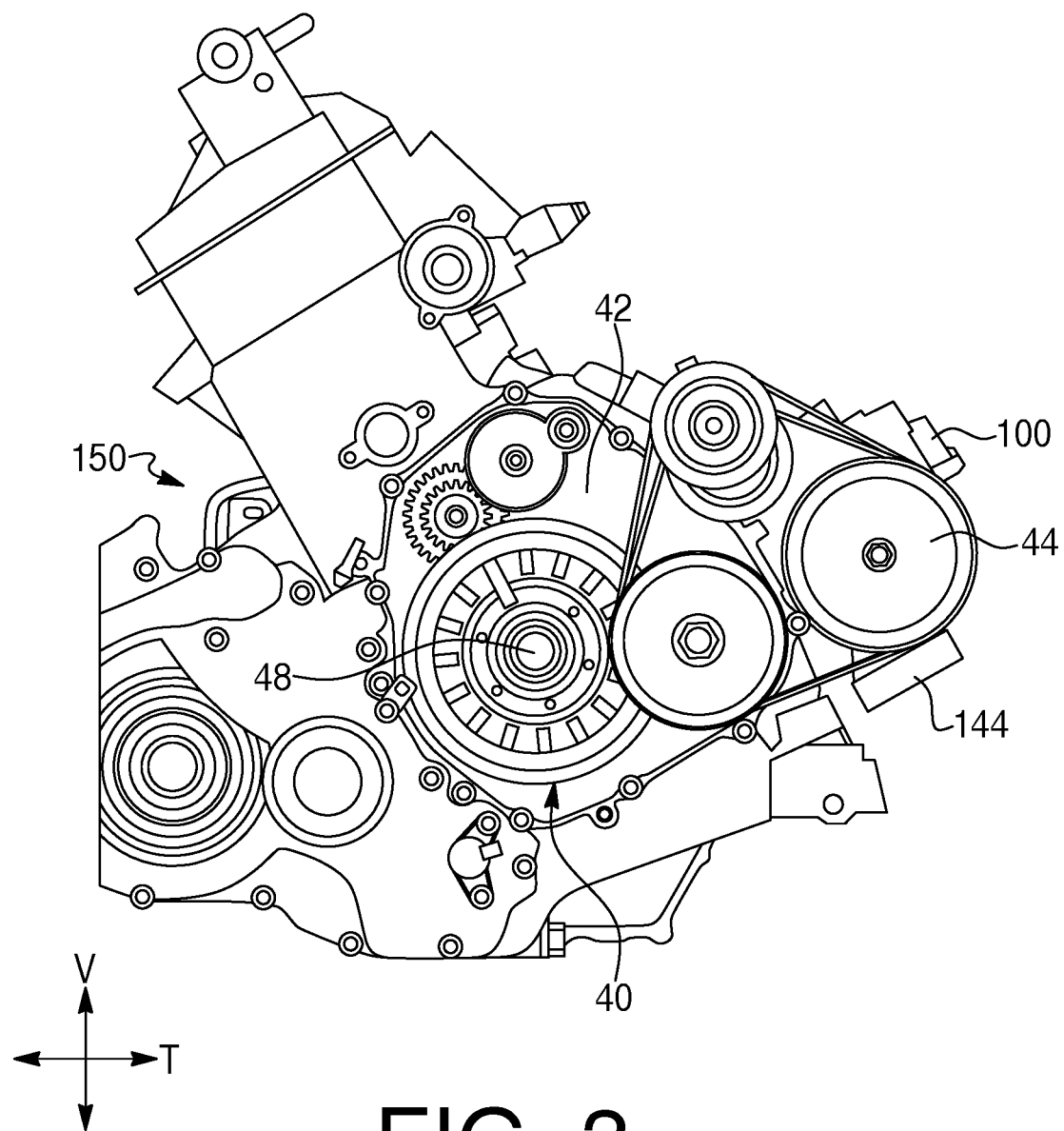
FIG. 3 depicts an engine and an alternating current generator of the power supply system made in accordance with principles of the disclosed subject matter.

FIG. 3 is an illustration of an alternating current generator (ACG) 40 of the power supply system 100 made in accordance with principles of the disclosed subject matter. The ACG 40 can be powered by the engine 42. The circuit that includes the ACG 40 can also include an electric motor/generator unit 44 configured to supply alternating current ("AC") (but possibly direct current ("DC") in certain embodiments) to an inverter 46. The electric generator 44 can be mounted to an engine block adjacent to and spaced from an output shaft 48 of the engine 42. Specifically, there can be a mounting structure 144 typically used for an air conditioning compressor. The air conditioning compressor can be replaced with the electric generator 44. In particular, because the vehicle 10 is designed for off road use and has a cabin that is not necessarily sealed from the elements, the electric generator 44 can be mounted to the mounting structure 144 instead of and in the location designated for an air conditioning compressor. The electric generator 44 can be coupled (rotationally coupled or otherwise coupled) to the engine 42. The output shaft 48 of the engine 42 can be directly connected to the electric generator 44 or can be connected to a transmission, such as a belt and pulley mechanism, that causes a rotary input to the electric generator 44 thereby generating electric power that can be output to the inverter 46 in the form of either AC or DC current. Alternatively, the structure to which the air conditioning compressor and/or the optional replacement electric generator 44 can be mounted is directly or integrally formed in the engine block such as via mount holes that are threaded or via mount clips that are formed in the block.

Figure 4:
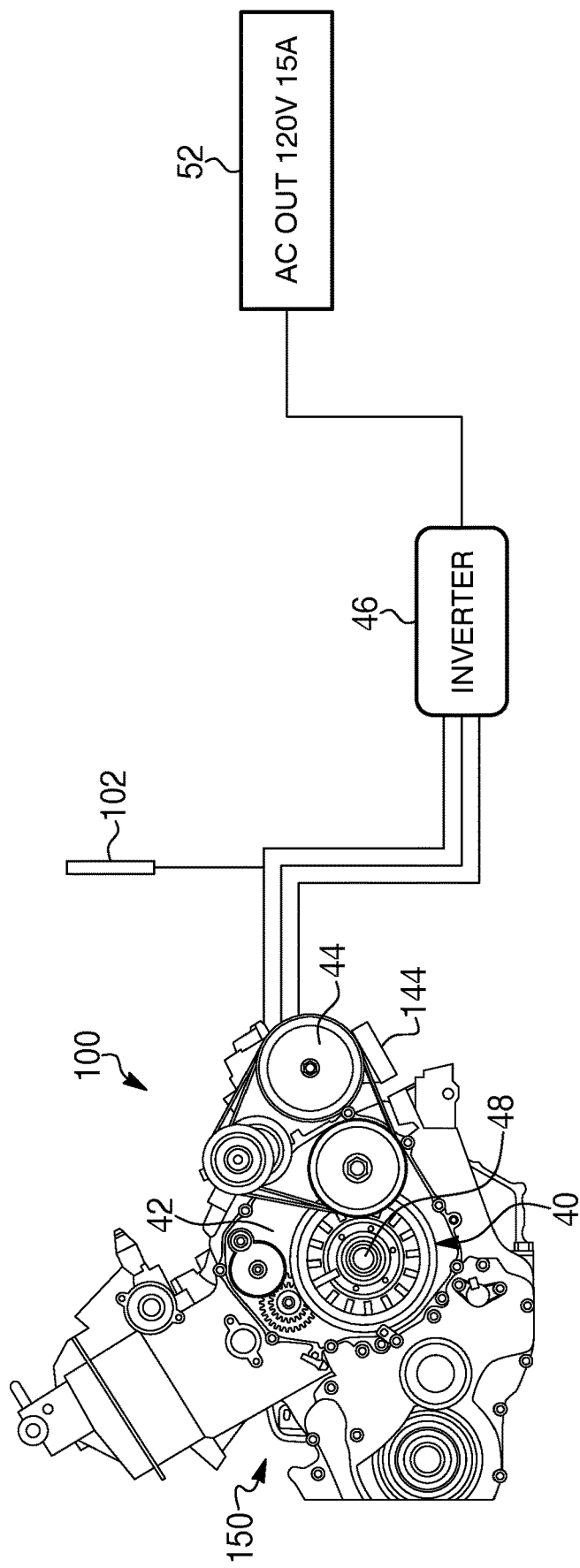
FIG. 4 is a schematic illustration of a power supply system for the vehicle of FIG. 1.

FIG. 4 is a schematic illustration of the power supply system 100. The power supply system 100 can include a controller 102, the ACG 40, the generator 44, the inverter 46, and one or more outlets 52 (one outlet 52 is shown for simplicity in FIG. 4). Each of the controller 102, ACG 40, generator 44, inverter 46, and the outlet 52 can be in electrical communication with each other.

Figure 5A:
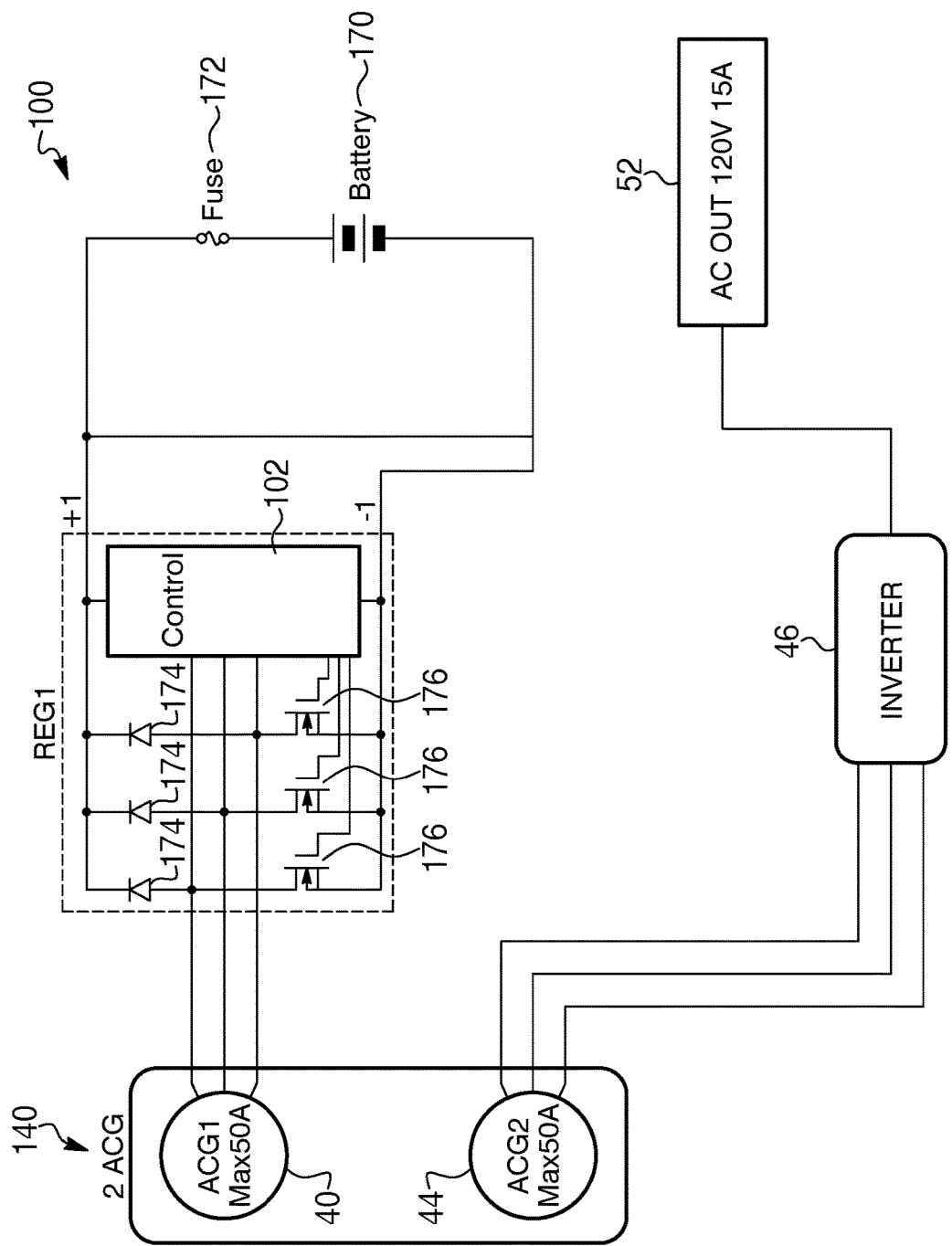
FIG. 5A is schematic illustration including a schematic wiring diagram of the power supply system of FIG. 4.

FIG. 5A is a schematic illustration of the power supply system 100 including a schematic wiring diagram of a circuit that includes an exemplary three phase short regulator/rectifier FET circuit that includes two alternating current generators (ACG's) 40, 44. The circuit can include a battery 170, a fuse 172, a controller 102, a plurality of diodes 174 (e.g., Schottky barrier diodes), the two ACG units 40, 44, and a plurality of MOSFET devices 176 with an inverter 46 and AC outlet(s) 52 connectable to a load. This type of regulator/rectifier can use MOSFETs and Schottky barrier diodes for the ACG output control elements to produce a synchronous rectification and achieve low-loss and large current. These three-phase short regulators/rectifiers can control high generator frequencies and supply the appropriate current to the inverter 46. The inverter 46 can then provide useable 120V alternating current to the socket(s) 52 when the vehicle 10 is in the generator mode. In this embodiment, the power supply system 100 can include an ACG 140 that includes an alternator ACG1, 40, and a generator ACG2, 44, each housed in a same structure and driven by a same power source, for example, by a belt drive or possibly by direct mount to a driven shaft from the engine 42 of the vehicle 10. In this case ACG1, 40 can produce three phase AC voltage that is supplied to a circuit REG1 that regulates/rectifies the voltage to output a DC voltage that charges the vehicle battery 170. ACG2, 44 also produces three phase AC voltage that is supplied to inverter 46 that inverts the voltage to DC voltage and then back to useable 120V 15A AC voltage that can be provided at an outlet 52, for example, in the bed of the vehicle.

Figure 5B:
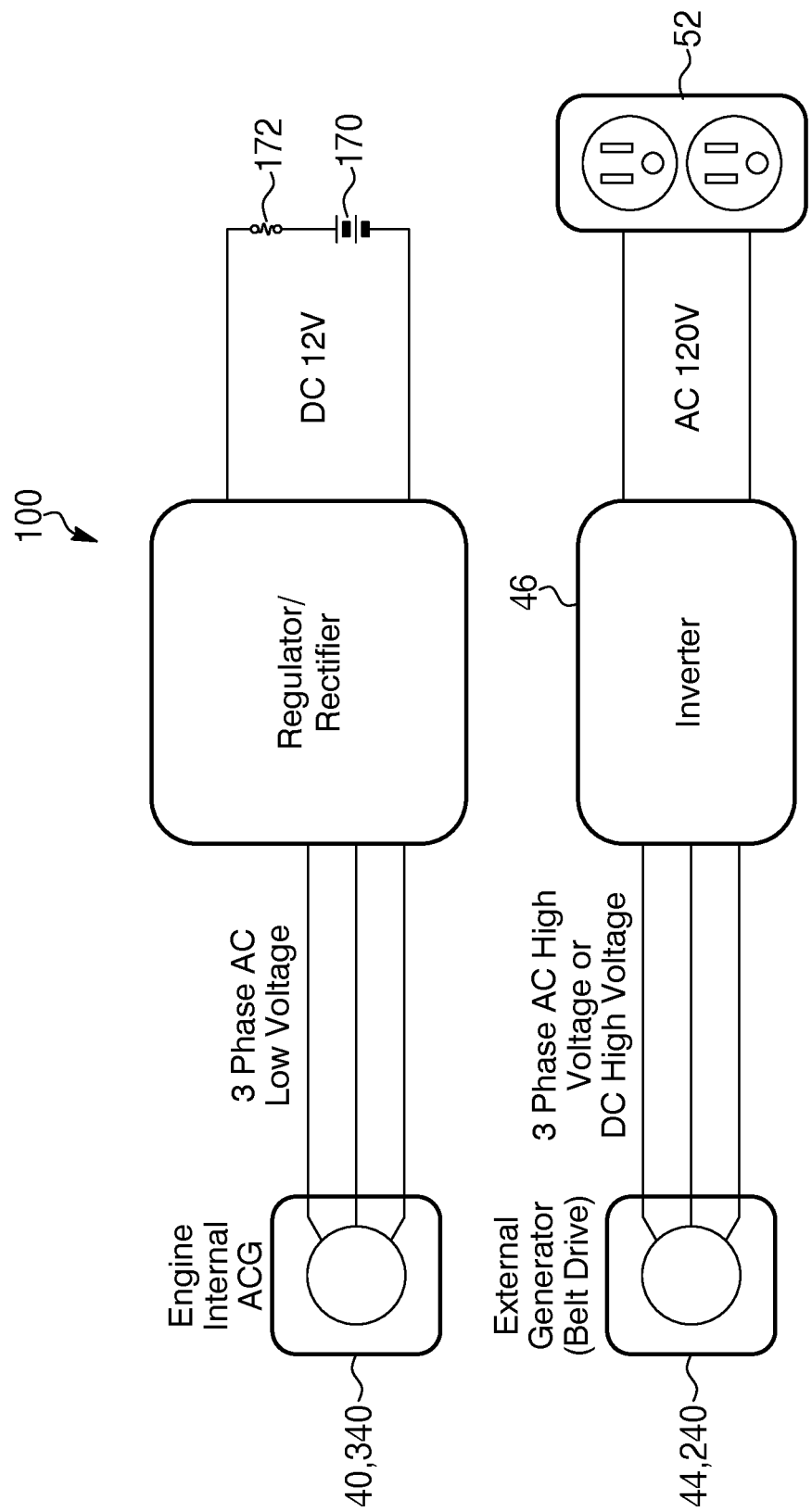
FIG. 5B is schematic illustration including a schematic wiring diagram of another embodiment of the power supply system of FIG. 4.

FIG. 5B depicts another embodiment of the power supply system 100 in which a ACG 240, 44 and a ACG 340, 40 are each separately housed with respect to each other. In this case, ACG 340 can be an internal generator, such as an alternator for the vehicle, that supplies three phase AC low voltage power to a regulator/rectifier circuit configured to then output 12V DC to battery 170 that is wired in series with a fuse 172. The ACG 340, 40 can be mounted directly to a driven shaft of the vehicle engine 42 (or can be connected to a belt or other drive train driven by the engine 42). A separate external generator ACG 240, 44 can be mounted to air conditioning compressor mounting structure 144 that is separate and spaced from the mount structure by which the alternator or ACG 340, 40 is mounted to the engine 42. The ACG 240, 44 can be belt driven, and is configured to provide three phase high voltage alternating current (or possibly DC high voltage current) to inverter 46. In the case where ACG 240, 44 provides three phase high voltage alternating current, the inverter 46 is configured to convert the AC voltage to DC voltage, treat (or clean) that voltage and convert it back to useable 120V AC voltage provided to an outlet 52, for example, in the rear bed of the vehicle 10. The ACG 240, 44 can be permanently mounted on the mounting structure 144. Alternatively, the ACG 240, 44 can be removably mounted to the mounting structure 144 such that the ACG240, 44 is an after market add-on, or can be attached only when the additional useable 120V AC voltage is desired in a particular application for the vehicle 10.

Figure 5C:
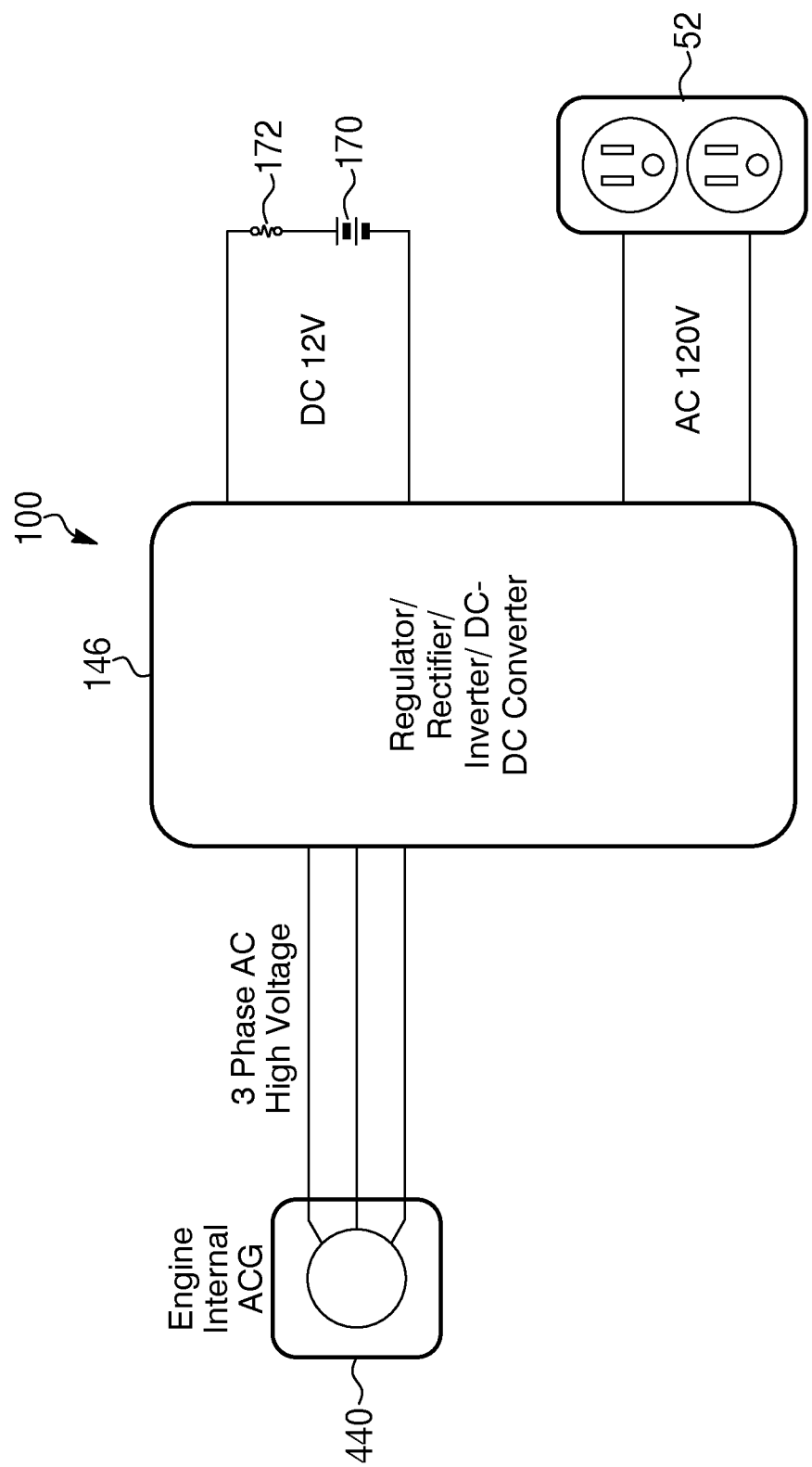
FIG. 5C is schematic illustration including a schematic wiring diagram of yet another embodiment of the power supply system of FIG. 4.

FIG. 5C depicts yet another embodiment of the power supply system 100 in which an ACG 440 is configured as an internal generator, such as an alternator for the vehicle, that supplies three phase AC high voltage power to a regulator/rectifier/inverter/DC-DC converter 146 which has two outputs. A first output provides 12V DC to battery 170 that is wired in series with fuse 172. The second output provides AC 120V to socket 52 that can be located in the bed of the vehicle 10. ACG 440 can be mounted directly to a driven shaft of the vehicle engine 42, or can be connected to a belt or other drive train driven by the engine 42. In this case, controller 102 can be configured to control the RPM of the engine 42 and power to the accessories (e.g., vehicle lights, HVAC, power steering, etc.), depending on whether the first output, second output or combination thereof are being output by the regulator/rectifier/inverter/DC-DC converter 146.

Figure 6:
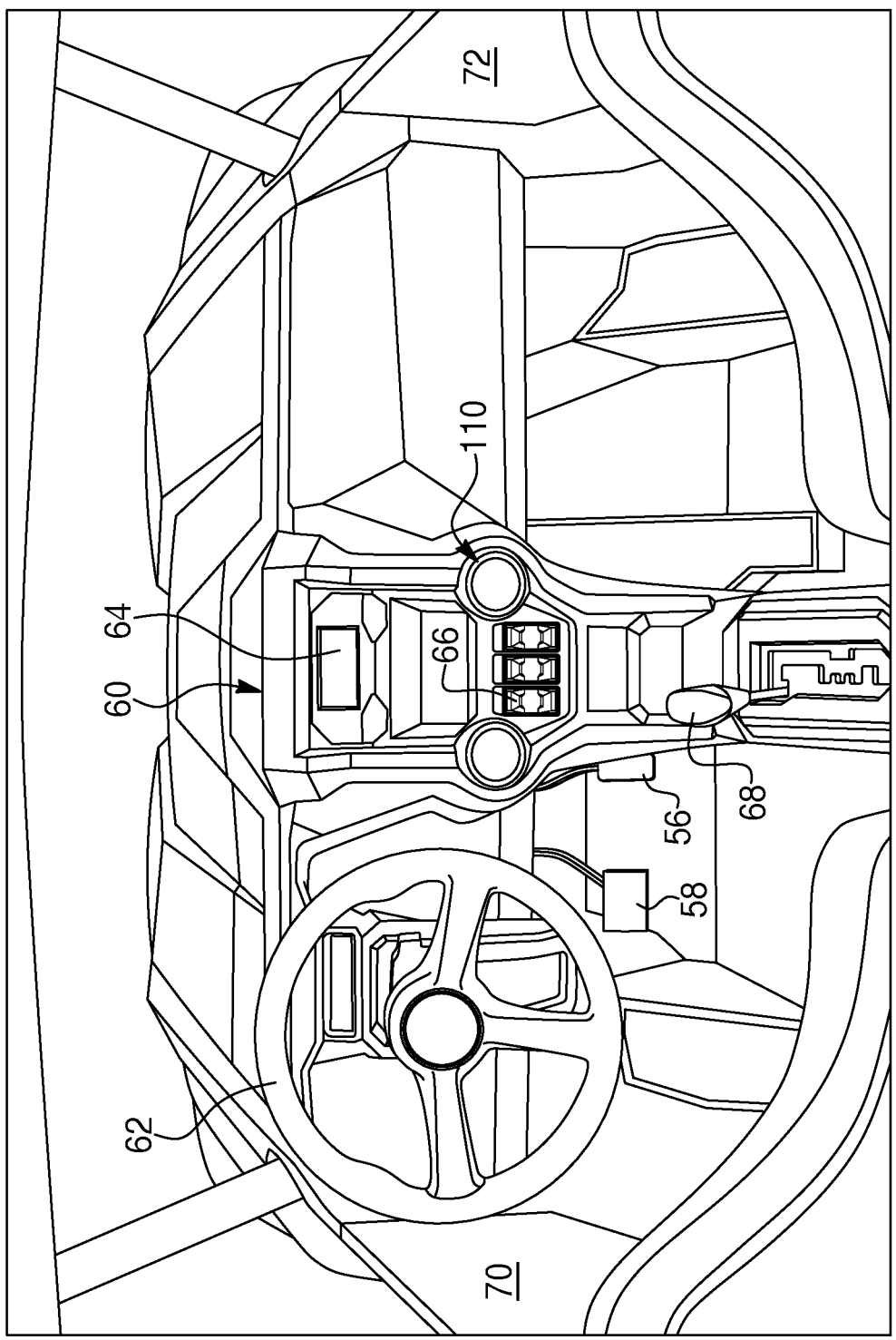
FIG. 6 is a perspective view of the instrument panel from inside the passenger space of the vehicle of FIG. 1.

FIG. 6 is a perspective view of the instrument panel 60 from inside the passenger space 86 of the vehicle 10 behind the front seats 26L, 26R. The instrument panel 60 (also referred to as the dashboard) can include a steering mechanism 62 such as a steering wheel, a display 64, and a switch 66 (e.g., button, toggle, touchscreen actuator, etc.) for engaging or disengaging the generator mode of the engine 42. When the generator mode is engaged, activated, or enabled, the engine 42 can be in a generator mode (also referred to as a first mode). When the generator mode is disengaged, the engine 42 can be in a normal mode (also referred to as the second mode). A gear shift lever 68, an accelerator pedal 56 (also referred to as a drive pedal), and a brake pedal 58 are also shown in FIG. 6.

Figure 7:
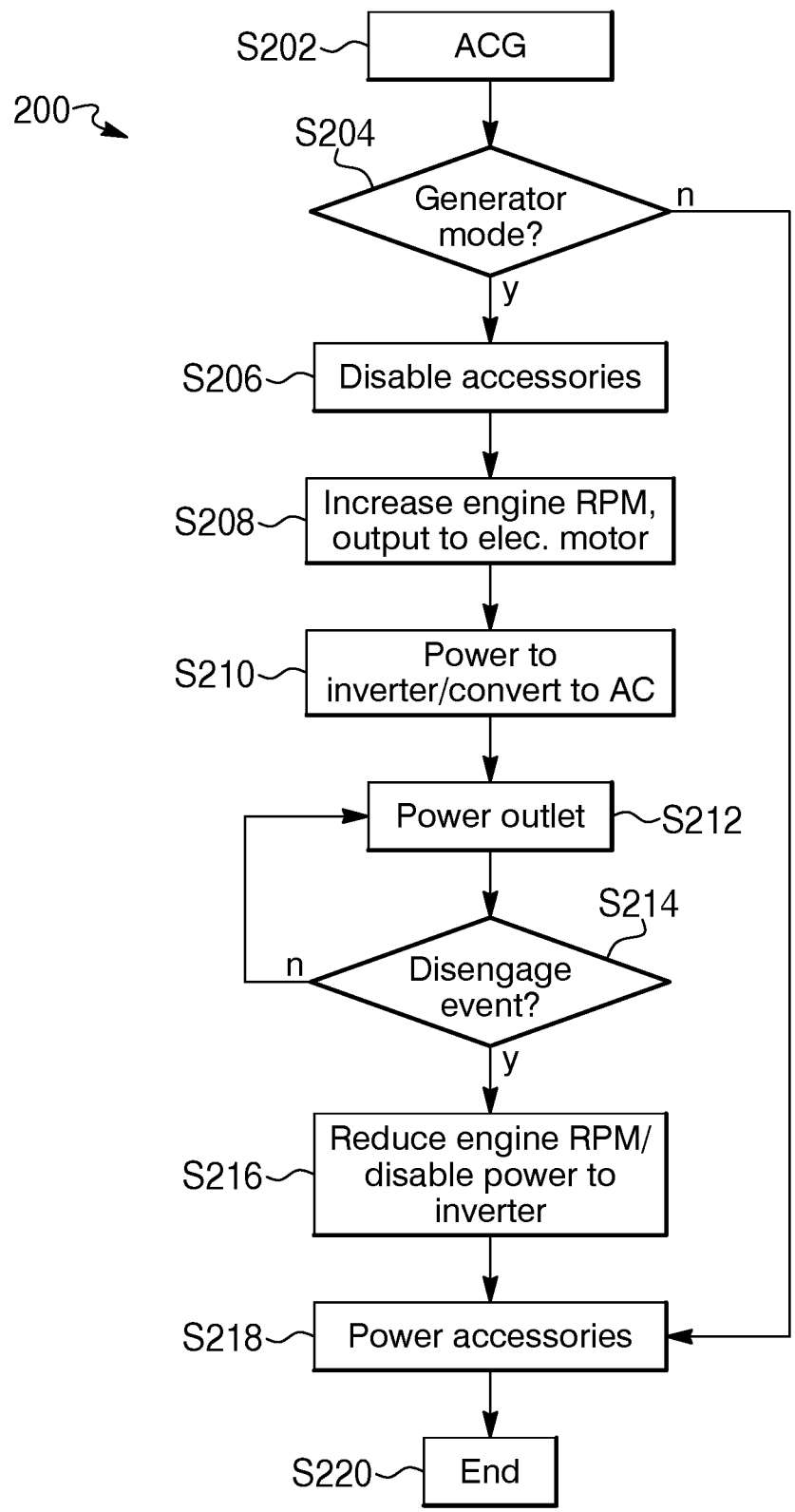
FIG. 7 is a flowchart showing a method of operating the alternating current generator of FIG. 3 in accordance with principles of the disclosed subject matter.

FIG. 7 is a flowchart showing a method of operating the ACG 40 in accordance with principles of the disclosed subject matter. As shown, the method starts in step S202 as a subroutine 200 is called by the controller 102 and passes onto step S204. In step S204, the controller 102 determines whether the engine 42 is in generator mode. If the engine 42 is not in generator mode, the controller 102 passes onto step S218 and supplies power from the engine 42 to the plurality of accessories 110 of the vehicle 10. The accessories 110 can include an entertainment system, air conditioning, heat, wipers, air pumps, hoist, and other known appliances or devices that can be used in a vehicle. If the engine 42 is in generator mode, the controller 102 passes onto step S206.

In step S206, the controller 102 disables power supply to a portion or all of the accessories 110. After step S206, the controller 102 can pass onto step S208.

In step S208, the controller 102 can increase the engine 42 output RPM and cause the electric generator 44 to either begin or increase DC power output. After step S208, the controller 102 can pass onto step S210.

In step S210, the controller 102 can supply DC power from the electric generator 44 to the inverter 46. Then the inverter 46 can convert the DC power to AC power. After step S210, the controller 102 can pass onto step S212. In step S212, the controller 102 can supply AC power to the power outlet 52 in the bed 15 of the vehicle 10. In step 212, depending on battery 170 and generator 44 capacity, power can also be provided to at least a portion of the accessories 110 in addition to the outlets 52, such as an entertainment system, air pumps, hoist, and other known appliances or devices that can be used in a vehicle when parked, for example, at a camp site or at an emergency operation location. In another embodiment, at step 212 all accessories 110 can be disconnected from the power source except for outlets 52, such that the generator 44 only powers the outlets 52 at step 212.

After step S212, the controller 102 can pass onto step S214.

In step S214, the controller 102 can determine whether a disengage event has occurred. A disengage event can be the actuation of a generator mode switch 66 on the instrument panel 60, the pressing of either the brake pedal 58 or the accelerator pedal 56, or the turning off an ignition to shut down the vehicle 10. If a disengage event has not occurred, the processor can return to step S212 and provide AC power to the power outlet 52 (and possibly other accessories 110, such as a hoist if the controller 102 determines that the vehicle 10 is in an emergency operation mode). If a disengage event has occurred, the controller 102 can pass onto step S216.

In step S216, the controller 102 can reduce the engine 42 output RPM. The controller 102 can disable power output to the electric generator 44 and the inverter 46. After step S216, the controller 102 can pass onto step S218.

In step S218, the controller 102 can supply power back to the plurality of accessories 110 of the vehicle 10 and return to normal operating status for the vehicle 10. After step S218, the controller 102 can pass onto step S220.

At step S220, the controller 102 can complete processing of the ACG 40.

Next, an implementation of a method of powering the outlet 52 in the bed 15 of the vehicle 10 will be described. The method of powering the outlet 52 can include the controller 102 calling subroutine 200 depicted in FIG. 7.

The method of powering the outlet 52 in the bed 15 of the vehicle 10 can include activating a generator mode of the engine 42, generating DC power by utilizing the electric generator 44 of the vehicle 10 coupled to the engine 42, supplying the DC power to the inverter 46, the inverter 46 converting the DC power to AC power, and supplying the AC power to the outlet 52 in the bed 15 of the vehicle 10.

Activating the generator mode of the engine 42 can be initiated by pressing or otherwise actuating the generator mode switch 66 on the instrument panel 60. It is contemplated that an application can be provided to a mobile device that communicates to the vehicle 10 and acts as a switch to place the vehicle 10 into generator (or other) mode. Activating the generator mode can include disabling, or reducing, power output of the engine 42 to a plurality of accessories 110. The plurality of accessories 110 can include an HVAC system, an electric power steering system, an audio system, a lighting system, or any other accessory of the vehicle 10.

Activating the generator mode can include increasing the revolutions per minute (RPM) of the output shaft 48 of the engine 42. The increased RPM will more efficiently generate electrical power from generator 44 to support application of 120V AC sockets in the bed of the vehicle 10, for example, in a side by side vehicle.

The method can include deactivating the generator mode when the ignition of the vehicle 10 is turned off, when a generator mode switch 66 is actuated, when the accelerator pedal 56 is actuated, when the brake pedal 58 is actuated, or when the vehicle 10 is shifted out of park.

The method of powering the outlet 52 can include providing the mounting structure 144 for an air conditioning compressor and mounting the electric generator 44 on the mounting structure 144 for the air conditioning compressor.

Electrical communication lines (not numbered) can connect the controller 102 to the engine 42, the transmission 150 and the sensor(s) in any appropriate manner. Electrical communication can be either one-way communication or two-way communication and can be networked or not networked, wired, or wireless or a hybrid of wired and wireless. The controller 102 also can be referred to as an electronic control unit (ECU) or as a central processing unit. The sensor(s) can be configured with hardware, with or without software, to perform the assigned task(s). The sensor(s) can be configured as a smart sensor such that the sensor(s) can process the raw data collected by the sensor(s) prior to transmission to the ECU 102 or the sensor(s) can be configured as a simple sensor that passes the raw data directly to the ECU 102 without any manipulation of the raw data. The sensor(s) can be configured to send data to the ECU 102, with or without a prompt from the ECU 102.

The gear shift lever 68 can be connected to the transmission 150, electrically, mechanically, or elector-mechanically, in any manner known in the art such that actuation of the gear shift lever 68 by the operator can effect a shift from one gear ratio to another gear ratio within the transmission 150. The gear shift lever 68 can be a mechanical lever or an electrical switch, as is known in the art. The gear shift lever 68 can be mounted in any one of a plurality of different locations within the vehicle, including but not limited to, on the center console, on the steering column, on the steering wheel 62, and on the instrument panel 60.

While certain embodiments of the invention are described above, it should be understood that the invention can be embodied and configured in many different ways without departing from the spirit and scope of the invention.

Embodiments are disclosed above in the context of a switch 66 for engaging and disengaging the generator mode of the engine 42. However, embodiments are intended to include or otherwise cover any type of actuator, including but not limited to a switch, a knob, an icon on a touch screen display 64, or any other actuator that can cause the engine to receive a signal to change between the first mode and the second mode.

The appliance 90 can be any external accessory including but not limited to a speaker, an amplifier, a refrigeration unit, a light, a grill, a power tool, emergency equipment, a freezer, a heater, a fan, or any other external accessory that can use AC power.

For example, exemplary embodiments are intended to cover all software or computer programs capable of enabling processors to implement the above operations, and designs. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

What is claimed is:

1. A method of powering an outlet in a bed of an all-terrain vehicle, the method comprising:
    providing an engine including an air conditioner compressor mount structure;
    connecting an electric generator to the air conditioner compressor mount structure;
    activating a generator mode of the engine;
    generating power by utilizing the electric generator of the all-terrain vehicle that is coupled to the engine via the air conditioner compressor mount structure;
    supplying the power to an inverter, the inverter converting the power to AC power;
    supplying the AC power to the outlet in the bed of the all-terrain vehicle; and
    disabling power output to the inverter when the generator mode is deactivated.

2. The method of claim 1, wherein:
    the mounting structure for the air conditioning compressor is located adjacent to and spaced from an alternating current generator that is connected to the engine.

3. The method of claim 1, wherein activating the generator mode of the engine includes disabling power output of the engine to a plurality of accessories.

4. The method of claim 3, wherein activating the generator mode of the engine includes disabling the power output to at least one of an HVAC system, an electric power steering system, an audio system, and a lighting system.

5. The method of claim 3, wherein activating the generator mode of the engine includes increasing the revolutions per minute (RPM) of an output shaft of the engine.

6. The method of claim 1, wherein the electric generator is mounted adjacent to the engine and driven by a belt pully, and the electric generator is spaced from an output shaft that powers an alternator for the vehicle.

7. The method of claim 1, further comprising:
    deactivating the generator mode when at least one of a switch, a drive pedal, and a brake pedal are actuated.

8. The method of claim 1, further comprising:
    deactivating the generator mode when a transmission of the all-terrain vehicle is shifted out of park.

9. The method of claim 1, further comprising:
    deactivating the generator mode when an ignition of the all-terrain vehicle is turned off.

10. The method of claim 1, wherein the outlet is a 120V AC socket.

11. The method of claim 1, wherein activating the generator mode includes pressing a push button switch on an instrument panel of the all-terrain vehicle.

12. An all-terrain vehicle, comprising:
    a frame assembly including a plurality of frame members connected together to extend around a passenger space, the frame assembly including a bed assembly disposed to a rear of the passenger space;
    a plurality of wheels attached to the frame assembly;
    an engine mounted to the frame assembly adjacent the passenger space, the engine having a first mode and a second mode;
    an electric generator motor coupled to the engine;
    an inverter electrically connected to the electric generator motor;
    an outlet electrically connected to the inverter and disposed in the bed assembly; and
    a controller electrically connected to the electric generator motor and configured to
        supply power generated by the electric generator motor to the inverter, the inverter converting the power to AC power, and supply the AC power to the outlet when the controller detects the engine is in the first mode, and
        disable power output to the inverter when the controller detects the engine is in the second mode.

13. The all-terrain vehicle of claim 12, further comprising:
    an alternating current generator, wherein the controller is further configured to:
    disable electric power output from the alternating current generator to a plurality of accessories when the controller detects the engine is in the first mode.

14. The all-terrain vehicle of claim 12 further comprising:
    an instrument panel mounted to the frame assembly, the instrument panel including a switch, wherein the switch is configured to switch the engine between the first mode and the second mode upon actuation.

15. The all-terrain vehicle of claim 12, further comprising:
    a transmission connected to the engine;
    a foot pedal for controlling at least one of acceleration and deceleration of the vehicle; and
    an ignition operatively connected to the engine, wherein the second mode is activated when the transmission of the all-terrain vehicle is shifted out of a park gear, the foot pedal of the all-terrain vehicle is pressed, or the ignition of the all-terrain vehicle is switched off.

16. The all-terrain vehicle of claim 12, wherein the outlet includes at least one 120V AC socket.

17. The all-terrain vehicle of claim 12, wherein the outlet is disposed outside of the passenger space.

18. The all-terrain vehicle of claim 12, wherein the frame assembly includes a mounting structure configured for mounting an air conditioning compressor thereto, and the electric generator motor is mounted to the mounting structure instead of the air conditioning compressor.

19. A power supply system for an all-terrain vehicle having an outlet in a bed of the all-terrain vehicle, the power supply system comprising:
    an engine configured to mount to the all-terrain vehicle, the engine having a first mode and a second mode;
    an electric generator motor mounted to a frame and adjacent to the engine;
    an inverter electrically connected to the electric generator motor, the outlet electrically connected to the inverter; and
    a controller electrically connected to the electric generator motor and configured to, supply power generated by the electric generator motor to the inverter, the inverter converting the power to AC power, and supply the AC power to the outlet while discontinuing power to at least one accessory when the controller detects the engine is in the first mode, and disable power output to the inverter when the controller detects the engine is in the second mode.

20. The power supply system for an all-terrain vehicle of claim 19, wherein the engine includes a mounting structure configured for mounting an air conditioning compressor thereto, and the electric generator motor is mounted to the mounting structure instead of the air conditioning compressor.

* * * * *